United States Patent
Xu et al.

(10) Patent No.: US 12,547,975 B2
(45) Date of Patent: Feb. 10, 2026

(54) GENERATING RECOMMENDATIONS FOR PICKERS SERVICING ORDERS PLACED WITH AN ONLINE CONCIERGE SYSTEM BASED ON ACTUAL AND FORECASTED ORDERS

(71) Applicant: Maplebear Inc., San Francisco, CA (US)

(72) Inventors: Youdan Xu, Burlingame, CA (US); Krishna Kumar Selvam, San Fransisco, CA (US); Michael Chen, San Francisco, CA (US); Radhika Anand, Sunnyvale, CA (US); Rebecca Riso, Croton-On-Hudson, NY (US); Ajay Pankaj Sampat, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 98 days.

(21) Appl. No.: 18/072,311

(22) Filed: Nov. 30, 2022

(65) Prior Publication Data

US 2024/0177108 A1    May 30, 2024

(51) Int. Cl.
*G06Q 10/08* (2024.01)
*G06Q 10/087* (2023.01)
*G06Q 30/02* (2023.01)
*G06Q 30/0202* (2023.01)

(52) U.S. Cl.
CPC ....... *G06Q 10/087* (2013.01); *G06Q 30/0202* (2013.01)

(58) Field of Classification Search
CPC .............................. G06Q 10/08; G06Q 30/02
See application file for complete search history.

(56) References Cited

U.S. PATENT DOCUMENTS

| 10,783,462 | B1  |   | 9/2020 | Mo et al. |
| 11,397,911 | B2  | * | 7/2022 | Silverman .......... G06Q 10/0834 |
| 11,429,991 | B1  | * | 8/2022 | Tran ..................... G06Q 10/087 |
| 11,436,554 | B2  | * | 9/2022 | Nguyen ............. G06Q 10/0834 |

(Continued)

OTHER PUBLICATIONS

PCT International Search Report and Written Opinion, PCT Application No. PCT/US2023/34692, Feb. 8, 2024, 7 pages.

*Primary Examiner* — Nga B Nguyen
(74) *Attorney, Agent, or Firm* — Fenwick & West LLP

(57) ABSTRACT

An online concierge system receives location information associated with pickers and actual orders associated with a geographical zone. A model trained to predict a likelihood an actual order associated with the zone will be available for servicing within a timeframe is accessed and applied to forecasted orders. Each picker is matched to an order for servicing by minimizing a value of a function that is based on a difference between a location associated with each picker matched to an actual order and an associated retailer location, a difference between the location associated with each picker matched to a forecasted order and an associated retailer location, and the predicted likelihood. Recommendations for accepting an actual order, moving to a retailer location associated with a forecasted order, or checking back later with the system are generated based on the matches and sent for display to a client device associated with each picker.

20 Claims, 6 Drawing Sheets

(56) References Cited

U.S. PATENT DOCUMENTS

| | | |
|---|---|---|
| 11,615,368 B2 * | 3/2023 | Fu .................. G06Q 10/0833 |
| | | 705/333 |
| 2020/0349632 A1 * | 11/2020 | Xu .................. G06Q 10/06316 |
| 2021/0241211 A1 | 8/2021 | Oprea et al. |
| 2022/0122029 A1 | 4/2022 | Martin et al. |
| 2022/0188910 A1 | 6/2022 | Jin et al. |
| 2022/0343395 A1 | 10/2022 | Luong et al. |
| 2022/0351120 A1 * | 11/2022 | Raghunathan ......... G06N 20/00 |
| 2023/0351477 A1 * | 11/2023 | Cornacchia ........ G06Q 30/0641 |

* cited by examiner

GENERATING RECOMMENDATIONS FOR PICKERS SERVICING ORDERS PLACED WITH AN ONLINE CONCIERGE SYSTEM BASED ON ACTUAL AND FORECASTED ORDERS

BACKGROUND

Online concierge systems allow customers to place online delivery orders and match the orders with pickers who service the orders on behalf of the customers. Pickers may service orders by performing different tasks involved in servicing the orders, such as driving to retailer locations, collecting items included in the orders, purchasing the items, and delivering the items to customers. Once an online concierge system receives an order from a customer, the online concierge system may notify several pickers available to service the order that the order is available for servicing. One or more pickers may then accept the order for servicing and proceed with the tasks involved in servicing the order. To service orders efficiently, online concierge systems often send notifications to pickers about orders available for servicing based on the pickers' current geographical locations. For example, if an online concierge system receives an order that includes items to be collected from a retailer location and a picker is already waiting in the parking lot for the retailer location, the online concierge system is more likely to send a notification about the order to this picker than to other pickers who are further away to reduce the risk that the order will be delivered late and to reduce costs for pickers (e.g., for gas, parking, tolls, etc.).

Although it is common for pickers to wait at or near retailer locations in anticipation of being notified about orders including items to be collected from the retailer locations, this strategy may negatively impact the efficiency with which orders may be serviced. For example, if 20 pickers are waiting in the same parking lot for a retailer location and only five out of eight orders about which the pickers receive notifications include items to be collected from the retailer location, the pickers who do not accept one of these orders may have to travel to other retailer locations to collect items included in the three remaining orders. In this example, if the other retailer locations are several miles away or there is a lot of traffic on the way to these retailer locations, the three remaining orders may be delivered late even though they could have been serviced on time if some of the pickers had been waiting closer to these retailer locations. Additionally, in the above example, if no additional orders are available for servicing for the remainder of the day, any pickers who were waiting in the parking lot but were unable to accept any orders for servicing may become dissatisfied and reduce their availability for servicing orders or even discontinue servicing orders.

SUMMARY

In accordance with one or more aspects of the disclosure, to service orders in a more efficient manner, an online concierge system generates recommendations for pickers servicing orders placed with the online concierge system based on actual and forecasted orders. More specifically, the online concierge system receives location information associated with pickers available to service orders placed with the online concierge system as well as a set of actual orders to be serviced, in which each actual order is associated with a geographical zone. The online concierge system accesses a machine learning model that is trained to predict a likelihood that an actual order associated with the geographical zone will be available for servicing within a timeframe. For each forecasted order of a set of forecasted orders associated with the geographical zone, the online concierge system applies the machine learning model to predict the likelihood that an actual order will be available for servicing within the timeframe. The online concierge system matches each picker to an order for servicing by minimizing a value of a matching and positioning function. The matching and positioning function is based on a first difference between a location associated with each picker matched to an actual order for servicing and an associated retailer location, a second difference between the location associated with each picker matched to a forecasted order for servicing and an associated retailer location, and the predicted likelihood for each forecasted order. Based on the matches, the online concierge system generates one or more recommendations to present to each picker to accept an actual order for servicing, to move to a retailer location associated with a forecasted order, or to check back with the online concierge system at a later time for actual and forecasted orders for servicing. The online concierge system then sends the recommendation(s) for display to a picker client device associated with each picker.

DETAILED DESCRIPTION

Figure 1:
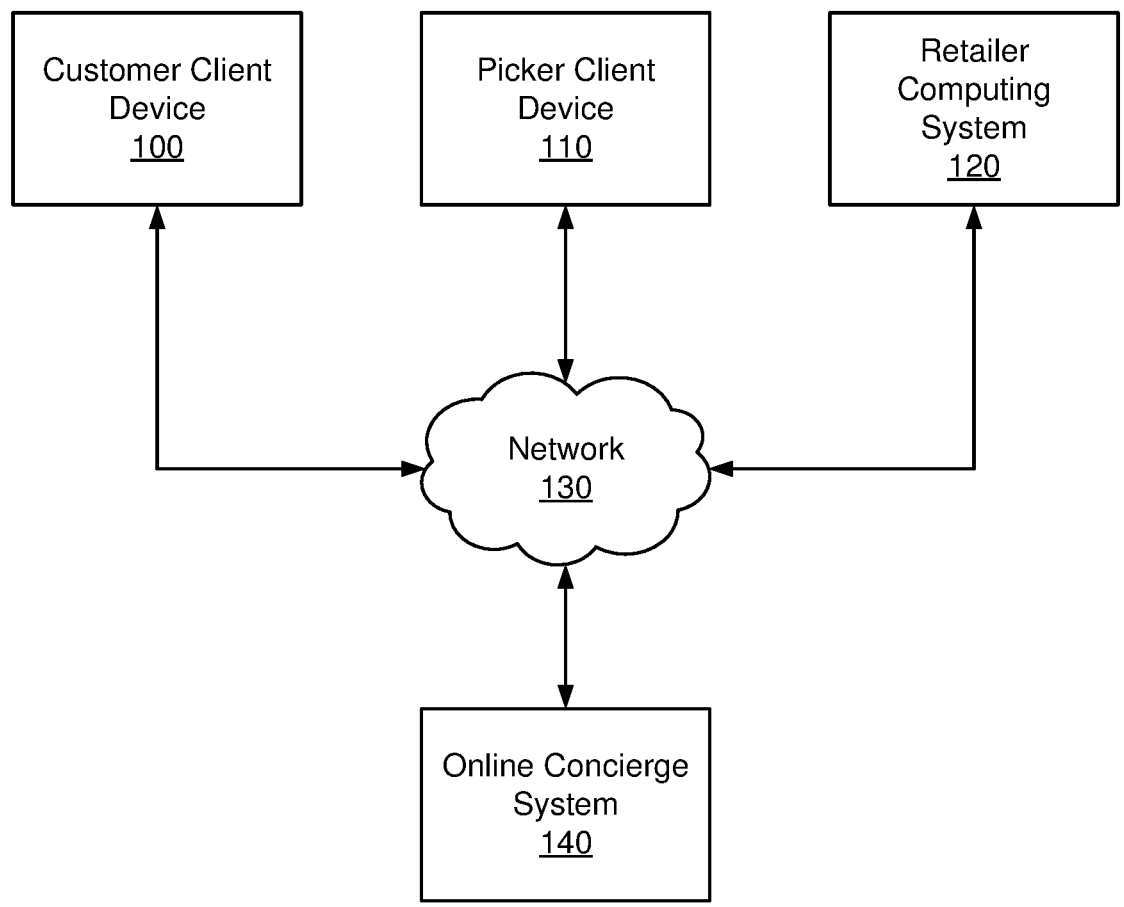
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer location. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 may provide item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
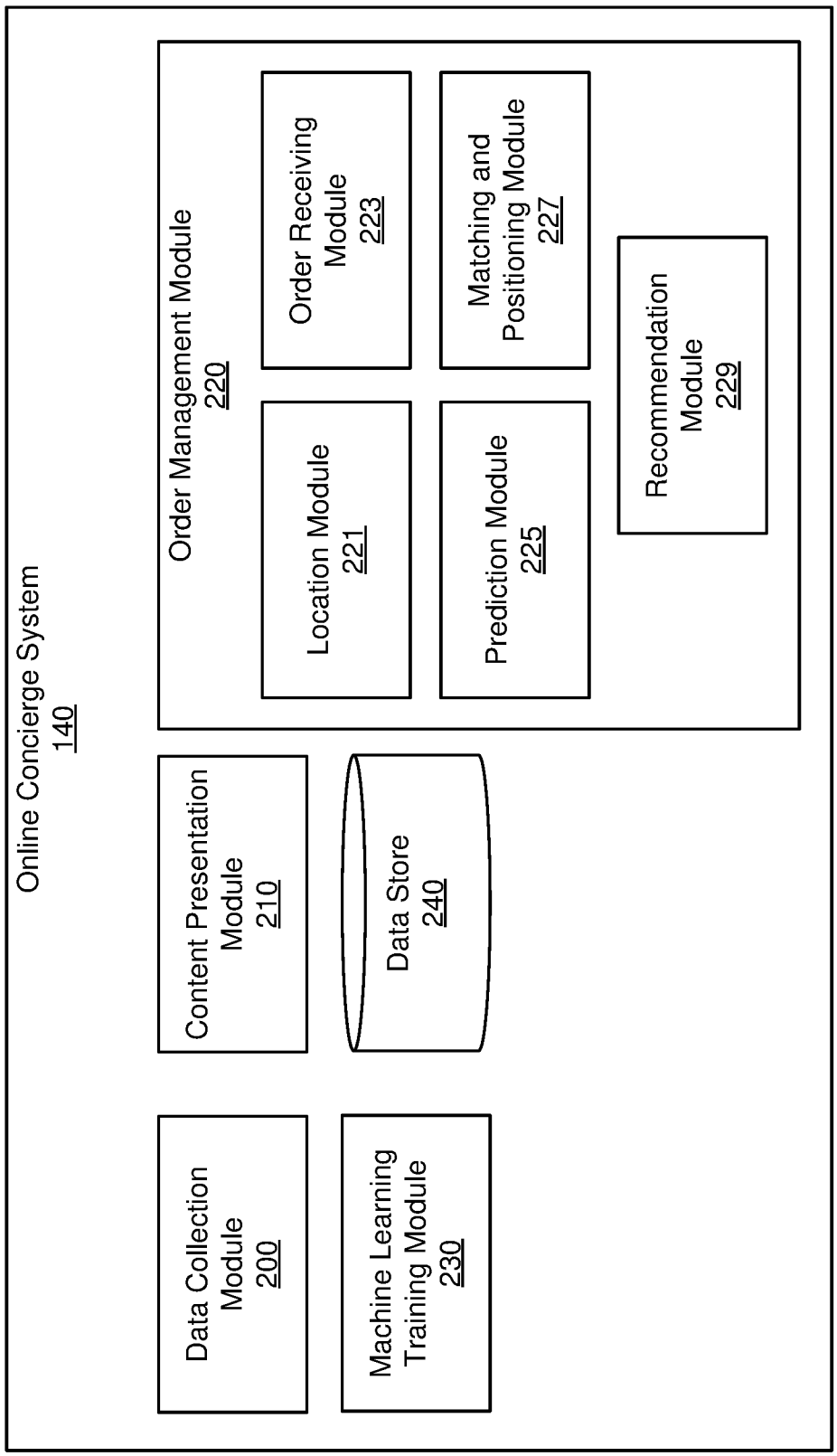
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the items. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. Components of the order management module 220 include a location module 221, an order receiving module 223, a prediction module 225, a matching and positioning module 227, and a recommendation module 229. The location module 221 tracks the locations of pickers based on locations of picker client devices 110 associated with the pickers while the order receiving module 223 receives orders from customer client devices 100, and the matching and positioning module 227 matches actual orders and forecasted orders (further described below) to pickers for servicing (e.g., based on picker data). For example, when the order receiving module 223 receives an order, the matching and positioning module 227 matches the order to a picker based on the picker's location tracked by the location module 221 and the retailer location from which the ordered items are to be collected. The recommendation module 229 then generates and sends recommendations to picker client devices 110 associated with pickers to accept actual orders for servicing, to move to retailer locations associated with forecasted orders within a timeframe, or to check back with the online concierge system 140 at a later time for actual and forecasted orders for servicing if none are currently available. By sending the recommendations for display to a picker client device, the online concierge system may cause the picker client device to generate and display one or more user interfaces that include the one or more recommendations.

As described above, the location module 221 receives location information associated with pickers available to service orders placed with the online concierge system 140. The location module 221 may receive the location information by tracking the location of picker client devices 110 associated with the pickers upon receiving permission from the picker client devices 110 to do so or based on information received from the picker client devices 110 indicating when the pickers are available to service orders. For example, the location module 221 may receive information describing a location of a picker client device 110 associated with a picker every 15 seconds during each time slot included in a schedule associated with the picker indicating that the picker is available to service orders or during any other span of time that the picker has indicated they are available to service orders. In this example, the location module 221 may receive the location of the picker client device 110 in the form of GPS coordinates associated with timestamps indicating the times at which the client device 110 was located at geographical locations corresponding to the GPS coordinates.

As also described above, the order receiving module 223 receives orders from customer client devices 100. Orders received by the order receiving module 223 are "actual orders" customers have placed with the online concierge system 140 that are available for servicing by pickers. Each actual order is associated with a geographical zone, which may correspond to one or more zip codes, cities, counties, or any other suitable geographical area. For example, an actual order may be associated with a geographical zone corresponding to a zip code if a retailer location from which items included in the actual order are to be collected is located within the zip code. The order receiving module 223 may receive various types of order data associated with each actual order. For example, the order receiving module 223 may receive information identifying items that are included in an actual order, a delivery location for the actual order, a customer associated with the actual order, a retailer location from which the items included in the actual order are to be collected, a timeframe within which the actual order is to be delivered, etc. In the above example, the order receiving module 223 also may receive information describing an amount of earnings for a picker who services the actual order and a tip amount, information describing any age-restricted items included in the actual order, a volume or a weight associated with one or more items included in the actual order, instructions for collecting the items, etc. In some embodiments, the order receiving module 223 may store the order data associated with an actual order in the data store 240.

The prediction module 225 may access an order availability model, which is a machine learning model that is trained to predict a likelihood that an actual order associated with a geographical zone will be available for servicing within a timeframe. A timeframe may correspond to a threshold amount of time from a current time. For example, the order availability model may be trained to predict the likelihood that an actual order including items to be collected from a retailer location within a geographical zone corresponding to one or more cities will be available for servicing within a timeframe corresponding to the next hour. As further described below, the order availability model may be trained by the machine learning training module 230.

The prediction module 225 also may apply the order availability model to predict a likelihood that an actual order will be available for servicing within a timeframe for a forecasted order. A forecasted order is a potential order that may be placed by a customer with the online concierge system 140 that has not materialized into an actual order available for servicing by a picker. In some embodiments, the prediction module 225 may apply the order availability model to predict the likelihood for a set of forecasted orders associated with a geographical zone. In such embodiments, the prediction module 225 may forecast the set of forecasted orders based on various types of information. For example, the set of forecasted orders may include every possible combination of orders that may be placed by one or more customers within a threshold distance of one or more retailer locations within the geographical zone, in which each order includes one or more items to be collected from the retailer location(s) and each order may be serviced within the timeframe. As an additional example, the set of forecasted orders may be similar to previous orders including items collected from various retailer locations within the geographical zone that were serviced during similar timeframes (e.g., the same day of the week and time of the day). In this example, the prediction module 225 may forecast the set of forecasted orders based on order data for the previous orders stored in the data store 240 (e.g., using a machine learning model based on a rate at which the previous orders were placed, items included in the previous orders, etc.). As yet another example, the set of forecasted orders may include orders that have been started but not completed (e.g., by customers who have added items to carts associated with retailer locations within the geographical zone within the last 10 minutes) or subscription/repeat orders scheduled to be placed within the timeframe that include items to be collected from retailer locations within the geographical zone. In some embodiments, the prediction module 225 may store order data associated with a forecasted order (e.g., attributes of the forecasted order, described below) in the data store 240.

The prediction module 225 may apply the order availability model to predict the likelihood that an actual order will be available for servicing within a timeframe for a forecasted order by providing a set of inputs to the order availability model that may affect whether the forecasted order will materialize into an actual order available for servicing within the timeframe. The set of inputs may include any attributes of the forecasted order, such as information identifying a retailer location from which one or more items included in the forecasted order are to be collected, information identifying the item(s) and any promotion/sale associated with each item, a geographical zone in which the retailer location is located, a delivery timeframe and delivery location for the forecasted order, etc. Once the prediction module 225 applies the order availability model to the set of inputs, it may receive an output from the order availability model corresponding to the predicted likelihood. For example, if the prediction module 225 receives an output from the order availability model corresponding to an 85% predicted likelihood, the output indicates there is an 85% likelihood that a forecasted order associated with a geographical zone will materialize into an actual order available for servicing within a timeframe.

The matching and positioning module 227 matches actual orders or forecasted orders to pickers for servicing. The matching and positioning module 227 may do so by minimizing a value of a matching and positioning function. The matching and positioning function is computed based on a total distance or a total travel time between pickers matched to actual orders for servicing and retailer locations from which items included in the actual orders are to be collected and a total expected distance or a total expected travel time between pickers matched to forecasted orders for servicing and retailer locations from which items included in the forecasted orders are to be collected. For example, the matching and positioning function may be based on a first difference, a second difference, and a predicted likelihood that each forecasted order associated with a geographical zone will be available for servicing within a timeframe. In this example, the first difference is between a location associated with each picker matched to an actual order for servicing and a retailer location associated with a corresponding actual order and the second difference is between the location associated with each picker matched to a forecasted order for servicing and a retailer location associated with a corresponding forecasted order. In the above example, the first difference and the second difference may correspond to distances or travel times. Additionally, in the above example, the matching and positioning function may be computed as a sum of the first difference and a product of the second difference and the predicted likelihood for each forecasted order.

In some embodiments, the matching and positioning module 227 minimizes the value of the matching and positioning function while observing a set of constraints. The set of constraints may include a minimum number of pickers matched to each actual order for servicing, a maximum number of actual orders matched to each picker for servicing, a minimum number of pickers matched to each forecasted order for servicing, or a maximum number of forecasted orders matched to each picker for servicing. The set of constraints also may include a joint optimization constraint, such as a maximum number of actual orders and forecasted orders included in one or more recommendations generated by the recommendation module 229 to present to each picker, as further described below.

The following example illustrates how the matching and positioning function may be computed. Assume that there are currently B actual orders available for servicing in a geographical zone and $k \forall k \in \{1, 2, \ldots, B\}$ represents actual order k. Assume also that there are S pickers in the zone, that there are F forecasted orders that may be available for servicing during a timeframe, and that $j \forall j \in \{1, 2, \ldots, S\}$ represents forecasted order j, in which order j is expected to materialize with a probability $p_j$, in which $0 < p_j < 1$. Let:

$x_{ik} \in \{0, 1\}$ represent whether picker i was matched to actual order k $y_{ij} \in \{0, 1\}$ represent whether picker i was matched to forecasted order j $d_{ik}$ represent distance/travel time from picker i to actual order k $d_{ij}$ represent distance/travel time from picker i to forecasted order j The matching and positioning function minimized by the matching and positioning module 227 may be expressed as:

$$\Sigma_{i=1,2,\ldots,S} \Sigma_{k=1,2,\ldots,B} x_{ik} d_{ik} + \Sigma_{i=1,2,\ldots,S} \Sigma_{j=1,2,\ldots,F} y_{ij} d_{ij} p_j$$

While the set of constraints may be expressed as:

$$\Sigma_{k=1,2,\ldots,B} x_{ik} <= M, \forall i=1,2,\ldots,S$$

$$\Sigma_{j=1,2,\ldots,F} y_{ij} <= M_f, \forall i=1,2,\ldots,S$$

$$\Sigma_{i=1,2,\ldots,S} x_{ik} >= N, \forall k=1,2,\ldots,B$$

$$\Sigma_{i=1,2,\ldots,S} y_{ij} >= N_f, \forall j=1,2,\ldots,F$$

$$\Sigma_{k=1,2,\ldots,B} x_{ik} + \Sigma_{j=1,2,\ldots,F} y_{ij} < M_{new}, x_{ik} \in \{0,1\} y_{ij} \in \{0,1\}$$

When minimizing a value of a matching and positioning function, the matching and positioning module 227 may match the actual orders or forecasted orders to pickers based on various factors. In some embodiments, the matching and positioning module 227 may match an actual order or a forecasted order to a picker based on an eligibility of the picker to service the order (e.g., based on the picker's training, ratings by customers, etc.), one or more preferences associated with the picker (e.g., for how far to travel to deliver an order), an intent of the picker (e.g., to service a maximum/minimum number of orders per day), etc. For example, the matching and positioning module 227 may match an actual or a forecasted order to a picker based on the number or types of items included in the order and a vehicle operated by the picker, such that orders that include several items or bulky items may not be matched to the picker if the vehicle operated by the picker is small. As another example, if an actual or a forecasted order includes age-restricted items, the matching and positioning module 227 may match the order to a picker based on whether the picker is eligible to service the order, such that the order may not be matched to the picker if the picker does not satisfy the age restriction. As an additional example, the matching and positioning module 227 may match an actual or a forecasted order to a picker based on the delivery location and the picker's preferences with regard to how far to travel to deliver an order, such that the order may not be matched to the picker if servicing the order would require the picker to travel further than indicated by their preferences. As yet another example, if a picker has indicated their intent to work only on weekends, the matching and positioning module 227 may not match an actual order or a forecasted order to the picker if the order is to be serviced on a weekday.

In some embodiments, the matching and positioning module 227 may match batches of actual orders or batches of forecasted orders to pickers. A batch may include multiple actual or forecasted orders that may be serviced by the same picker to whom the batch is assigned because it may be more efficient to have the same picker service the batch than to have different pickers service different orders included in the batch. For example, actual orders received by the order receiving module 223 during the same time interval may be included in the same batch to be serviced by the same picker based on a retailer location at which items included in each actual order are to be collected, a delivery location to which each actual order is to be delivered, etc. In embodiments in which the matching and positioning module 227 matches batches of actual orders or batches of forecasted orders to pickers, the batches may be matched to the pickers in a manner analogous to that described above.

Once actual orders or forecasted orders are matched to pickers by the matching and positioning module 227, the recommendation module 229 generates one or more recommendations to present to each picker based on the matches and sends the recommendations for display to picker client devices 110 associated with the pickers. A recommendation generated by the recommendation module 229 may be for accepting an actual order for servicing, for moving to a retailer location associated with a forecasted order within a timeframe, or for checking back with the online concierge system 140 at a later time for actual and forecasted orders for servicing. For example, suppose that based on the minimized value of the matching and positioning function, the matching and positioning module 227 matches multiple actual orders or forecasted orders to a picker. In this example, the recommendation module 229 may then generate multiple recommendations to present to the picker, in which each recommendation is for accepting an actual order to which the picker was matched for servicing, or for moving, within a timeframe, to a retailer location associated with a forecasted order to which the picker was matched. As an additional example, suppose that based on the minimized value of the matching and positioning function, the matching and positioning module 227 does not match any actual orders or forecasted orders to a picker. In this example, the recommendation module 229 may then generate a recommendation to present to the picker, in which the recommendation is for checking back with the online concierge system 140 at a later time for actual and forecasted orders for servicing.

In some embodiments, the recommendation module 229 also may generate one or more recommendations to present to each picker based on a set of constraints or rules. In embodiments in which the matching and positioning module 227 matches actual orders or forecasted orders to pickers based on a set of constraints, the recommendation module 229 may generate the recommendation(s) to present to each picker based on one or more of the constraints. For example, if the set of constraints includes a joint optimization constraint, such as a maximum of 10 actual orders and forecasted orders included in the recommendations generated by the recommendation module 229 to present to each picker, the recommendation module 229 may generate at most 10 recommendations to present to each picker. In embodiments in which the recommendation module 229 generates the recommendation(s) to present to each picker based on a set of rules, the set of rules may be used by the recommendation module 229 to determine the content of the recommendation(s) or an order in which to present the content. For example, the recommendation module 229 may generate recommendations to present to a picker based on a rule that requires recommendations for actual orders to be presented in more prominent positions of a display area of a picker client device 110 than recommendations to move to retailer locations associated with forecasted orders. As an additional example, suppose that a recommendation to accept an actual order and a recommendation to move to a retailer location associated with a forecasted order are included among the recommendations that may be generated by the recommendation module 229 to present to a picker. In this example, the recommendation module 229 may generate the recommendations to present to the picker based on a rule that excludes the recommendation to move to the retailer location associated with the forecasted order if a maximum threshold distance or travel time between the retailer location associated with the forecasted order and another retailer location associated with the actual order is exceeded.

A recommendation may include various types of information. A recommendation for accepting an actual order for servicing may include an amount of earnings for servicing the actual order and a tip amount, tasks involved in servicing the actual order, a number of items or units included in the actual order, a retailer location at which the items are to be collected, a distance between a current location of a picker client device 110 to which the recommendation is sent and the retailer location, etc. A recommendation for moving to a retailer location associated with a forecasted order within a timeframe may include the timeframe and various types of estimated or predicted information associated with the forecasted order (e.g., an estimated amount of earnings for servicing the forecasted order, an estimated tip amount, predicted tasks involved in servicing the forecasted order, etc.). In some embodiments, a recommendation for moving to a retailer location associated with a forecasted order within a timeframe also may include an amount of compensation. For example, a recommendation for moving to a retailer location associated with a forecasted order within a timeframe may include an $8.00 relocation compensation that a picker may earn if they accept the recommendation or move to the retailer location within the timeframe. A recommendation to check back with the online concierge system 140 at a later time for actual and forecasted orders for servicing may include various types of information, such as information indicating that no orders are available within a geographical zone, an amount of time that a picker should wait before checking back with the online concierge system 140, etc.

In various embodiments, the recommendation module 229 also may generate additional types of recommendations to present to pickers and send the recommendations for display to picker client devices 110 associated with the pickers. In some embodiments, the recommendation module 229 may generate a recommendation identifying one or more retailer locations that are currently busy or are likely to be busy, promotions or sales associated with one or more retailer locations, etc. For example, a recommendation may indicate that a picker may want to move to a retailer location that is busy or that is usually busy during the time of the day and day of the week because an actual order is more likely to materialize at the retailer location than at other retailer locations closer to the picker. As an additional example, a recommendation may indicate that a picker may want to move to a retailer location that is offering a promotion or having a sale because an actual order is more likely to materialize at the retailer location than at other retailer locations closer to the picker. In the above examples, the recommendation module 229 may send the recommendations to pickers to which the matching and positioning module 227 does not match any actual orders or forecasted orders based on the minimized value of the matching and positioning function.

In various embodiments, the recommendation module 229 also may generate a recommendation to present to pickers who have not indicated that they are currently available to service orders placed with the online concierge system 140. In such embodiments, the recommendation may include an amount of compensation, information indicating whether an actual order is available for servicing, or any other suitable types of information. For example, if the matching and positioning module 227 is unable to match at least a threshold number or percentage of actual orders to pickers for servicing, the recommendation module 229 may generate a recommendation for pickers to change their availability for servicing orders. In this example, the recommendation may be sent to picker client devices 110 associated with pickers who have not indicated that they are currently available to service orders based on the location of the picker client devices 110 and the retailer locations at which items included in the actual orders are to be collected. In the above example, the recommendation may include an hourly compensation for each picker who changes their availability to indicate that they are available to service orders or information describing actual orders available for servicing that include items to be collected from retailer locations in the same geographical zone as a picker client device 110 associated with each picker.

Once the recommendation module 229 sends recommendations to picker client devices 110 associated with pickers, the order management module 220 may receive responses to the recommendations. Upon receiving responses from picker client devices 110 to accept recommendations to accept actual orders for servicing, the actual orders may be assigned to pickers associated with the picker client devices 110 and the pickers may then proceed with the tasks involved in servicing the actual orders. In some embodiments, forecasted orders also may be assigned to pickers upon receiving responses from picker client devices 110 associated with the pickers to accept recommendations to move to retailer locations associated with forecasted orders within their associated timeframes. In such embodiments, if the forecasted orders subsequently materialize into actual orders, the actual orders may then be assigned to the pickers.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order receiving module 223 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

Using the location module 221, the order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location using the location module 221. The location module 221 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker using the location module 221 as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

In embodiments in which the prediction module 225 accesses an order availability model that is trained to predict a likelihood that an actual order associated with a geographical zone will be available for servicing within a timeframe, as described above, the machine learning training module 230 may train the order availability model. The machine learning training module 230 may train the order availability model via supervised learning based on historical data associated with a demand side associated with the online concierge system 140. For example, the machine learning training module 230 may train the order availability model based on order data stored in the data store 240 describing previous actual orders placed with the online concierge system 140 received from the order receiving module 223 and previous forecasted orders received from the prediction module 225. Order data used to train the order availability model may include attributes associated with previous forecasted orders that did or did not materialize into actual orders. For example, the machine learning training module 230 may receive a set of training examples including attributes of previous forecasted orders that may have been placed with the online concierge system 140. In this example, the machine learning training module 230 also may receive a label for each forecasted order indicating whether the forecasted order materialized into an actual order available for servicing by a picker. Continuing with this example, the machine learning training module 230 may then train the order availability model based on the attributes of the forecasted orders and the label for the forecasted orders by comparing its output from input data of each training example to the label for the training example. As described above, attributes of a forecasted order may identify a retailer location from which one or more items included in the forecasted order are to be collected, information identifying the item(s) and any promotion/sale associated with each item, a geographical zone in which the retailer location is located, a delivery timeframe and delivery location for the forecasted order, or any other suitable attributes of a forecasted order.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
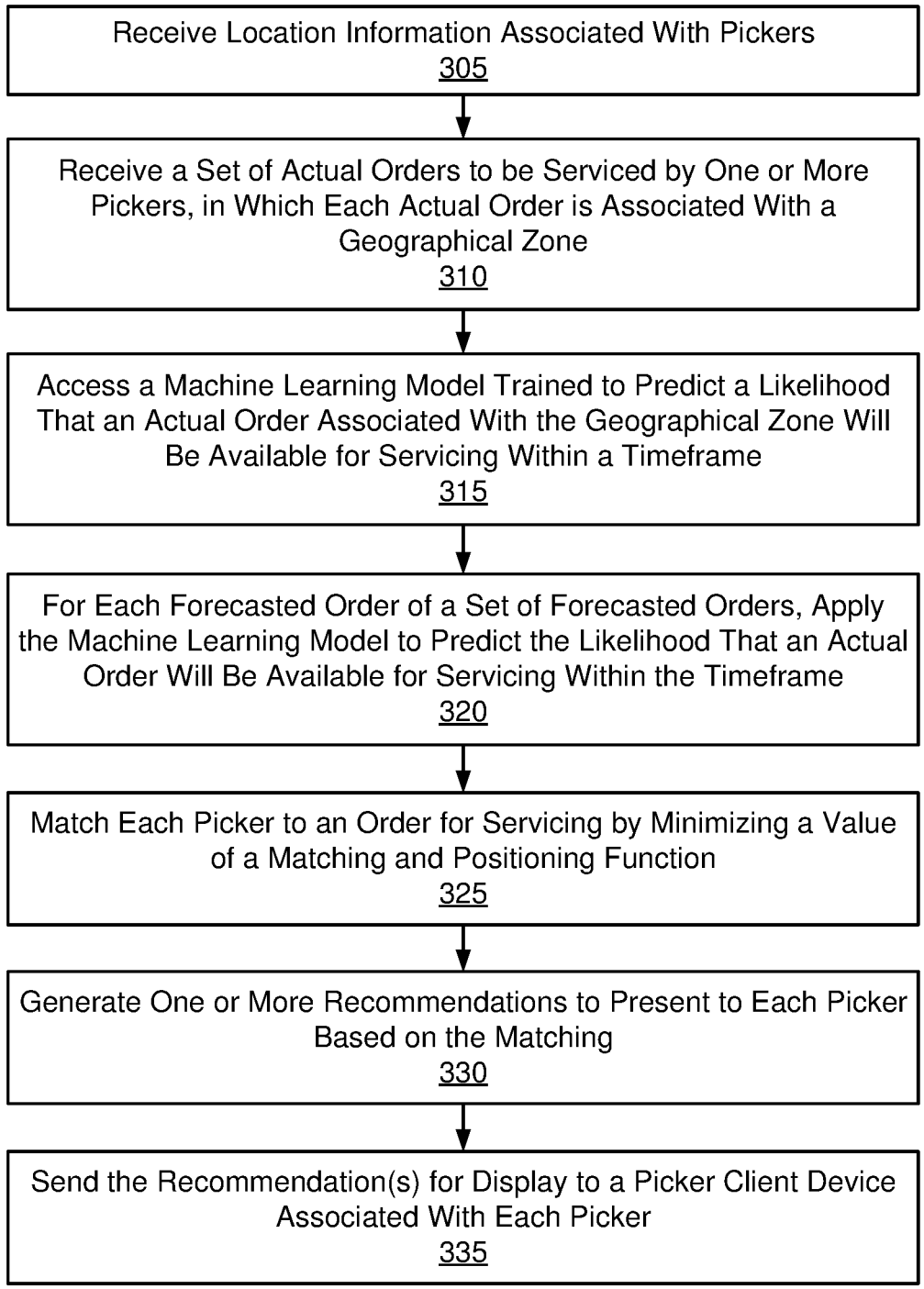
FIG. 3 is a flowchart of a method for generating recommendations for pickers servicing orders placed with an online concierge system based on actual and forecasted orders, in accordance with one or more embodiments.

Generating Recommendations for Pickers Servicing Orders Placed with an Online Concierge System Based on Actual and Forecasted Orders FIG. 3 is a flowchart of a method for generating recommendations for pickers servicing orders placed with an online concierge system 140 based on actual and forecasted orders, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 receives 305 (e.g., via the location module 221) location information associated with pickers available to service orders placed with the online concierge system 140. The online concierge system 140 may receive 305 the location information by tracking the location of picker client devices 110 associated with the pickers upon receiving permission from the picker client devices 110 to do so or based on information received from the picker client devices 110 indicating when the pickers are available to service orders. For example, the online concierge system 140 may receive 305 information describing a location of a picker client device 110 associated with a picker every 15 seconds during each time slot included in a schedule associated with the picker indicating that the picker is available to service orders or during any other span of time that the picker has indicated they are available to service orders. In this example, the online concierge system 140 may receive 305 the location of the picker client device 110 in the form of GPS coordinates associated with timestamps indicating the times at which the client device 110 was located at geographical locations corresponding to the GPS coordinates.

The online concierge system 140 also receives 310 (e.g., via the order receiving module 223) a set of actual orders to be serviced by one or more pickers. The online concierge system 140 may receive 310 the set of actual orders from each customer client device 100 associated with a customer who has placed an actual order with the online concierge system 140. Each actual order is associated with a geographical zone, which may correspond to one or more zip codes, cities, counties, or any other suitable geographical area. For example, an actual order may be associated with a geographical zone corresponding to a zip code if a retailer location from which items included in the actual order are to be collected is located within the zip code. The online concierge system 140 may receive (step 310) various types of order data associated with each actual order. For example, the online concierge system 140 may receive 310 information identifying items that are included in an actual order, a delivery location for the actual order, a customer associated with the actual order, a retailer location from which the items included in the actual order are to be collected, a timeframe within which the actual order is to be delivered, etc. In the above example, the online concierge system 140 also may receive 310 information describing an amount of earnings for a picker who services the actual order and a tip amount, information describing any age-restricted items included in the actual order, a volume or a weight associated with one or more items included in the actual order, instructions for collecting the items, etc. In some embodiments, the online concierge system 140 may store the order data associated with an actual order (e.g., in the data store 240).

The online concierge system 140 then accesses 315 (e.g., using the prediction module 225) an order availability model, which is a machine learning model that is trained to predict a likelihood that an actual order associated with the geographical zone will be available for servicing within a timeframe. The timeframe may correspond to a threshold amount of time from a current time. For example, the order availability model may be trained to predict the likelihood that an actual order including items to be collected from a retailer location within the geographical zone corresponding to one or more cities will be available for servicing within the timeframe corresponding to the next hour. In some embodiments, the order availability model may be trained by the online concierge system 140 (e.g., by the machine learning training module 230).

For each forecasted order of a set of forecasted orders associated with the geographical zone, the online concierge system 140 applies 320 (e.g., using the prediction module 225) the order availability model to predict the likelihood that an actual order will be available for servicing within the timeframe. A forecasted order is a potential order that may be placed by a customer with the online concierge system 140 that has not materialized into an actual order available for servicing by a picker. In some embodiments, the online concierge system 140 may forecast (e.g., using the prediction module 225) the set of forecasted orders based on various types of information. For example, the set of forecasted orders may include every possible combination of orders that may be placed by one or more customers within a threshold distance of one or more retailer locations within the geographical zone, in which each order includes one or more items to be collected from the retailer location(s) and each order may be serviced within the timeframe. As an additional example, the set of forecasted orders may be similar to previous orders including items collected from various retailer locations within the geographical zone that were serviced during similar timeframes (e.g., the same day of the week and time of the day). In this example, the online concierge system 140 may forecast the set of forecasted orders based on order data for the previous orders (e.g., using a machine learning model based on a rate at which the previous orders were placed, items included in the previous orders, etc. stored in the data store 240). As yet another example, the set of forecasted orders may include orders that have been started but not completed (e.g., by customers who have added items to carts associated with retailer locations within the geographical zone within the last 10 minutes) or subscription/repeat orders scheduled to be placed within the timeframe that include items to be collected from retailer locations within the geographical zone. In some embodiments, the online concierge system 140 may store (e.g., using the prediction module 225) order data associated with a forecasted order (e.g., attributes of the forecasted order, described below, in the data store 240).

The online concierge system 140 may apply 320 the order availability model to predict the likelihood that an actual order will be available for servicing within the timeframe for a forecasted order by providing a set of inputs to the order availability model that may affect whether the forecasted order will materialize into an actual order available for servicing within the timeframe. The set of inputs may include any attributes of the forecasted order, such as information identifying a retailer location from which one or more items included in the forecasted order are to be collected, information identifying the item(s) and any promotion/sale associated with each item, the geographical zone in which the retailer location is located, a delivery timeframe and delivery location for the forecasted order, etc. Once the online concierge system 140 applies 320 the order availability model to the set of inputs, it may receive an output from the order availability model corresponding to the predicted likelihood. For example, if the online concierge system 140 receives an output from the order availability model corresponding to an 85% predicted likelihood, the output indicates there is an 85% likelihood that a forecasted order associated with the geographical zone will materialize into an actual order available for servicing within the timeframe.

The online concierge system 140 then matches 325 (e.g., using the matching and positioning module 227) each picker to an order (actual or forecasted) for servicing. The online concierge system 140 may do so by minimizing a value of a matching and positioning function. The matching and positioning function is computed based on a total distance or a total travel time between pickers matched 325 to actual orders for servicing and retailer locations from which items included in the actual orders are to be collected and a total expected distance or a total expected travel time between pickers matched 325 to forecasted orders for servicing and retailer locations from which items included in the forecasted orders are to be collected. For example, the matching and positioning function may be based on a first difference, a second difference, and the predicted likelihood that each forecasted order associated with the geographical zone will be available for servicing within the timeframe. In this example, the first difference is between a location associated with each picker matched 325 to an actual order for servicing and a retailer location associated with a corresponding actual order and the second difference is between the location associated with each picker matched 325 to a forecasted order for servicing and a retailer location associated with a corresponding forecasted order. In the above example, the first difference and the second difference may correspond to distances or travel times. Additionally, in the above example, the matching and positioning function may be computed as a sum of the first difference and a product of the second difference and the predicted likelihood for each forecasted order.

In some embodiments, the online concierge system 140 minimizes the value of the matching and positioning function while observing a set of constraints. The set of constraints may include a minimum number of pickers matched 325 to each actual order for servicing, a maximum number of actual orders matched 325 to each picker for servicing, a minimum number of pickers matched 325 to each forecasted order for servicing, or a maximum number of forecasted orders matched 325 to each picker for servicing. The set of constraints also may include a joint optimization constraint, such as a maximum number of actual orders and forecasted orders included in one or more recommendations generated 330 by the online concierge system 140 (e.g., by the recommendation module 229) to present to each picker, as further described below.

The following example illustrates how the matching and positioning function may be computed. Assume that there are currently B actual orders available for servicing in the geographical zone and $k \forall k \in \{1, 2, \ldots, B\}$ represents actual order k. Assume also that there are S pickers in the zone, that there are F forecasted orders that may be available for servicing during a timeframe, and that $j \forall j \in \{1, 2, \ldots, S\}$ represents forecasted order j, in which order j is expected to materialize with a probability $p_j$, in which $0 < p_j < 1$. Let:

$x_{ik} \in \{0, 1\}$ represent whether picker i was matched to actual order k $y_{ij} \in \{0, 1\}$ represent whether picker i was matched to forecasted order j $d_{ik}$ represent distance/travel time from picker i to actual order k $d_{ij}$ represent distance/travel time from picker i to forecasted order j The matching and positioning function minimized by the matching and positioning module 227 may be expressed as:

$$\Sigma_{i=1,2,\ldots,S}\Sigma_{k=1,2,\ldots,B}x_{ik}d_{ik}+\Sigma_{i=1,2,\ldots,S}\Sigma_{j=1,2,\ldots,F}y_{ij}d_{ij}p_j$$

While the set of constraints may be expressed as:

$$\Sigma_{k=1,2,\ldots,B}x_{ik}<=M, \forall i=1,2,\ldots,S$$

$$\Sigma_{j=1,2,\ldots,F}y_{ij}<=M_f \forall i=1,2,\ldots,S$$

$$\Sigma_{i=1,2,\ldots,S}x_{ik}>=N, \forall k=1,2,\ldots,B$$

$$\Sigma_{i=1,2,\ldots,S}y_{ij}>=N_f \forall j=1,2,\ldots,F$$

$$\Sigma_{k=1,2,\ldots,B}x_{ik}+\Sigma_{j=1,2,\ldots,F}y_{ij}<M_{new}, x_{ik} \in \{0,1\} y_{ij} \in \{0,1\}$$

When minimizing the value of the matching and positioning function, the online concierge system 140 may match 325 the actual orders or forecasted orders to pickers based on various factors. In some embodiments, the online concierge system 140 may match 325 an actual order or a forecasted order to a picker based on an eligibility of the picker to service the order (e.g., based on the picker's training, ratings by customers, etc.), one or more preferences associated with the picker (e.g., for how far to travel to deliver an order), an intent of the picker (e.g., to service a maximum/minimum number of orders per day), etc. For example, the online concierge system 140 may match 325 an actual or a forecasted order to a picker based on the number or types of items included in the order and a vehicle operated by the picker, such that orders that include several items or bulky items may not be matched 325 to the picker if the vehicle operated by the picker is small. As another example, if an actual or a forecasted order includes age-restricted items, the online concierge system 140 may match 325 the order to a picker based on whether the picker is eligible to service the order, such that the order may not be matched 325 to the picker if the picker does not satisfy the age restriction. As an additional example, the online concierge system 140 may match 325 an actual or a forecasted order to a picker based on the delivery location and the picker's preferences with regard to how far to travel to deliver an order, such that the order may not be matched 325 to the picker if servicing the order would require the picker to travel further than indicated by their preferences. As yet another example, if a picker has indicated their intent to work only on weekends, the online concierge system 140 may not match 325 an actual order or a forecasted order to the picker if the order is to be serviced on a weekday.

In some embodiments, the online concierge system 140 may match (step 325) batches of actual orders or batches of forecasted orders to pickers. A batch may include multiple actual or forecasted orders that may be serviced by the same picker to whom the batch is assigned because it may be more efficient to have the same picker service the batch than to have different pickers service different orders included in the batch. For example, actual orders received 310 by the online concierge system 140 during the same time interval may be included in the same batch to be serviced by the same picker based on a retailer location at which items included in each actual order are to be collected, a delivery location to which each actual order is to be delivered, etc. In embodiments in which the online concierge system 140 matches (step 325) batches of actual orders or batches of forecasted orders to pickers, the batches may be matched 325 to the pickers in a manner analogous to that described above.

Once actual orders or forecasted orders are matched 325 to pickers by the online concierge system 140, the online concierge system 140 generates 330 (e.g., using the recommendation module 229) one or more recommendations to present to each picker based on the matches and sends 335 the recommendation(s) for display to a picker client device 110 associated with each picker. A recommendation generated 330 by the online concierge system 140 may be for accepting an actual order for servicing, for moving to a retailer location associated with a forecasted order within the timeframe, or for checking back with the online concierge system 140 at a later time for actual and forecasted orders for servicing. For example, suppose that based on the minimized value of the matching and positioning function, the online concierge system 140 matches (step 325) multiple actual orders or forecasted orders to a picker. In this example, the online concierge system 140 may then generate (step 330) multiple recommendations to present to the picker, in which each recommendation is for accepting an actual order to which the picker was matched 325 for servicing, or for moving, within the timeframe, to a retailer location associated with a forecasted order to which the picker was matched 325. As an additional example, suppose that based on the minimized value of the matching and positioning function, the online concierge system 140 does not match 325 any actual orders or forecasted orders to a picker. In this example, the online concierge system 140 may then generate 330 a recommendation to present to the picker, in which the recommendation is for checking back with the online concierge system 140 at a later time for actual and forecasted orders for servicing.

In some embodiments, the online concierge system 140 also may generate 330 the recommendation(s) to present to each picker based on a set of constraints or rules. In embodiments in which the online concierge system 140 matches (step 325) actual orders or forecasted orders to pickers based on a set of constraints, the online concierge system 140 may generate 330 the recommendation(s) to present to each picker based on one or more of the constraints. For example, if the set of constraints includes a joint optimization constraint, such as a maximum of 10 actual orders and forecasted orders included in the recommendations generated 330 by the online concierge system 140 to present to each picker, the online concierge system 140 may generate 330 at most 10 recommendations to present to each picker. In embodiments in which the online concierge system 140 generates 330 the recommendation(s) to present to each picker based on a set of rules, the set of rules may be used by the online concierge system 140 to determine the content of the recommendation(s) or an order in which to present the content. For example, the online concierge system 140 may generate (step 330) recommendations to present to a picker based on a rule that requires recommendations for actual orders to be presented in more prominent positions of a display area of a picker client device 110 than recommendations to move to retailer locations associated with forecasted orders. As an additional example, suppose that a recommendation to accept an actual order and a recommendation to move to a retailer location associated with a forecasted order are included among the recommendations that may be generated 330 by the online concierge system 140 to present to a picker. In this example, the online concierge system 140 may generate (step 330) the recommendations to present to the picker based on a rule that excludes the recommendation to move to the retailer location associated with the forecasted order if a maximum threshold distance or travel time between the retailer location associated with the forecasted order and another retailer location associated with the actual order is exceeded.

Figure 4A:
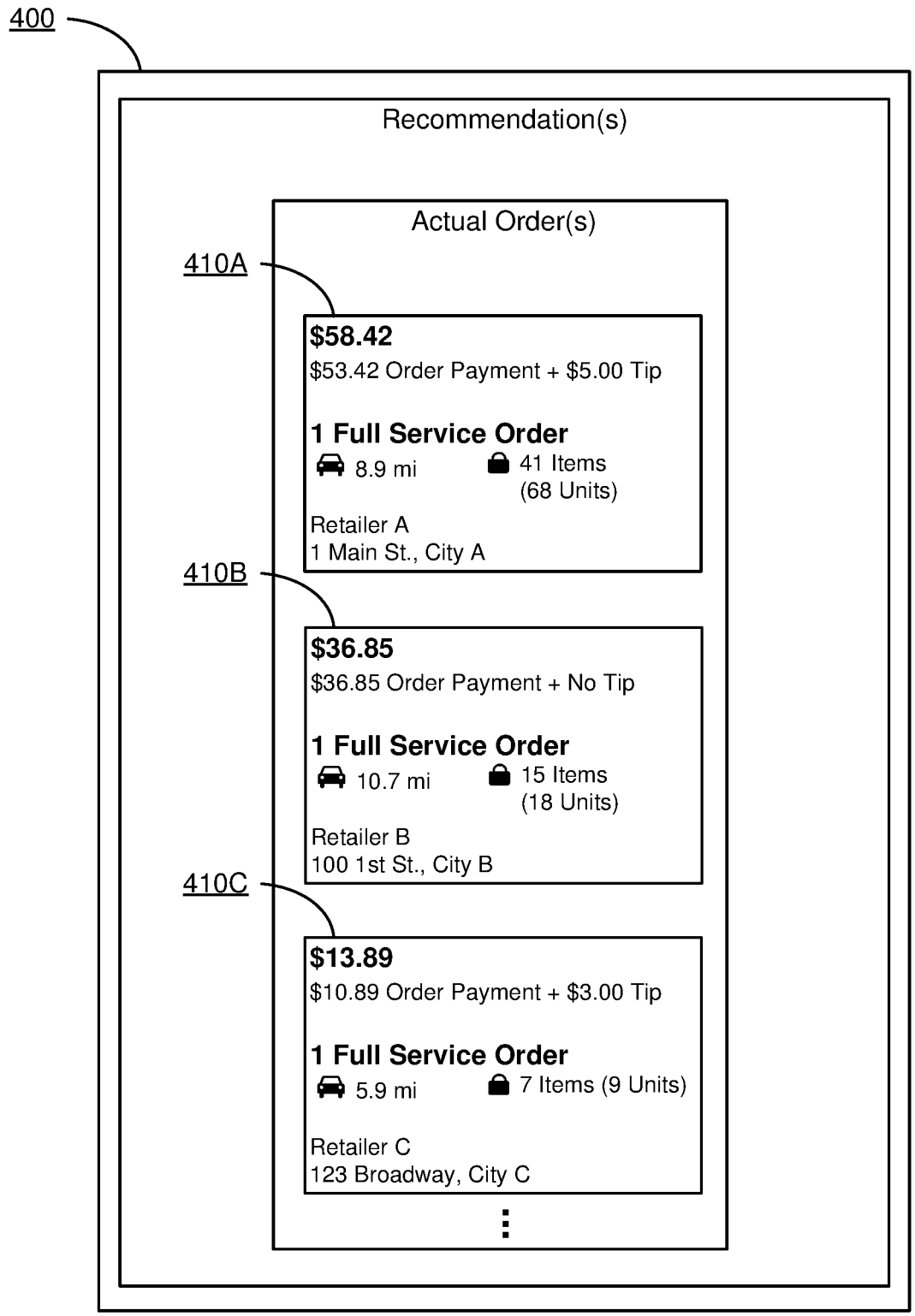
FIGS. 4A-4C illustrate examples of user interfaces sent for display to picker client devices associated with pickers servicing orders placed with an online concierge system based on actual and forecasted orders, in accordance with one or more embodiments.
Figure 4B:
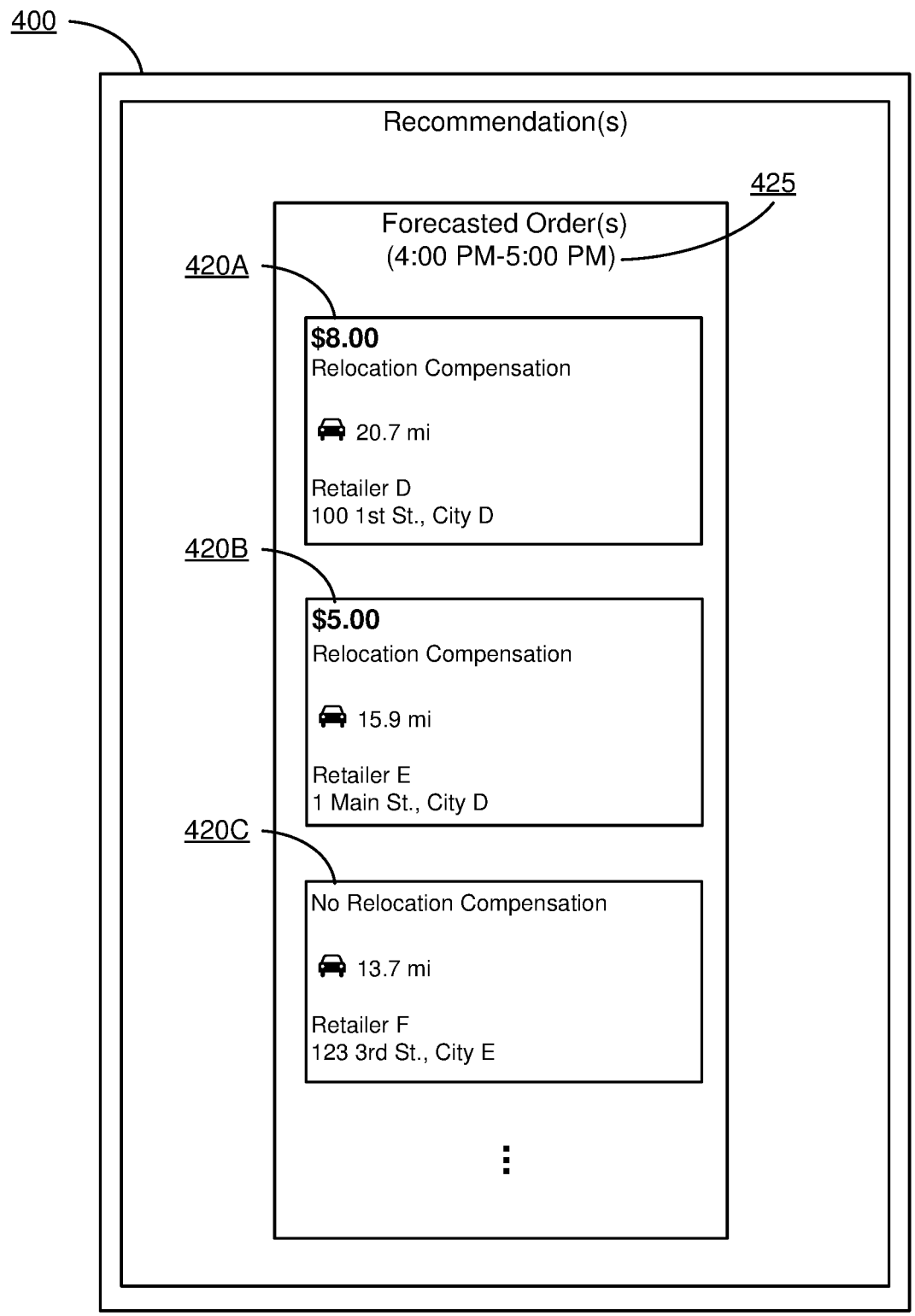
Figure 4C:
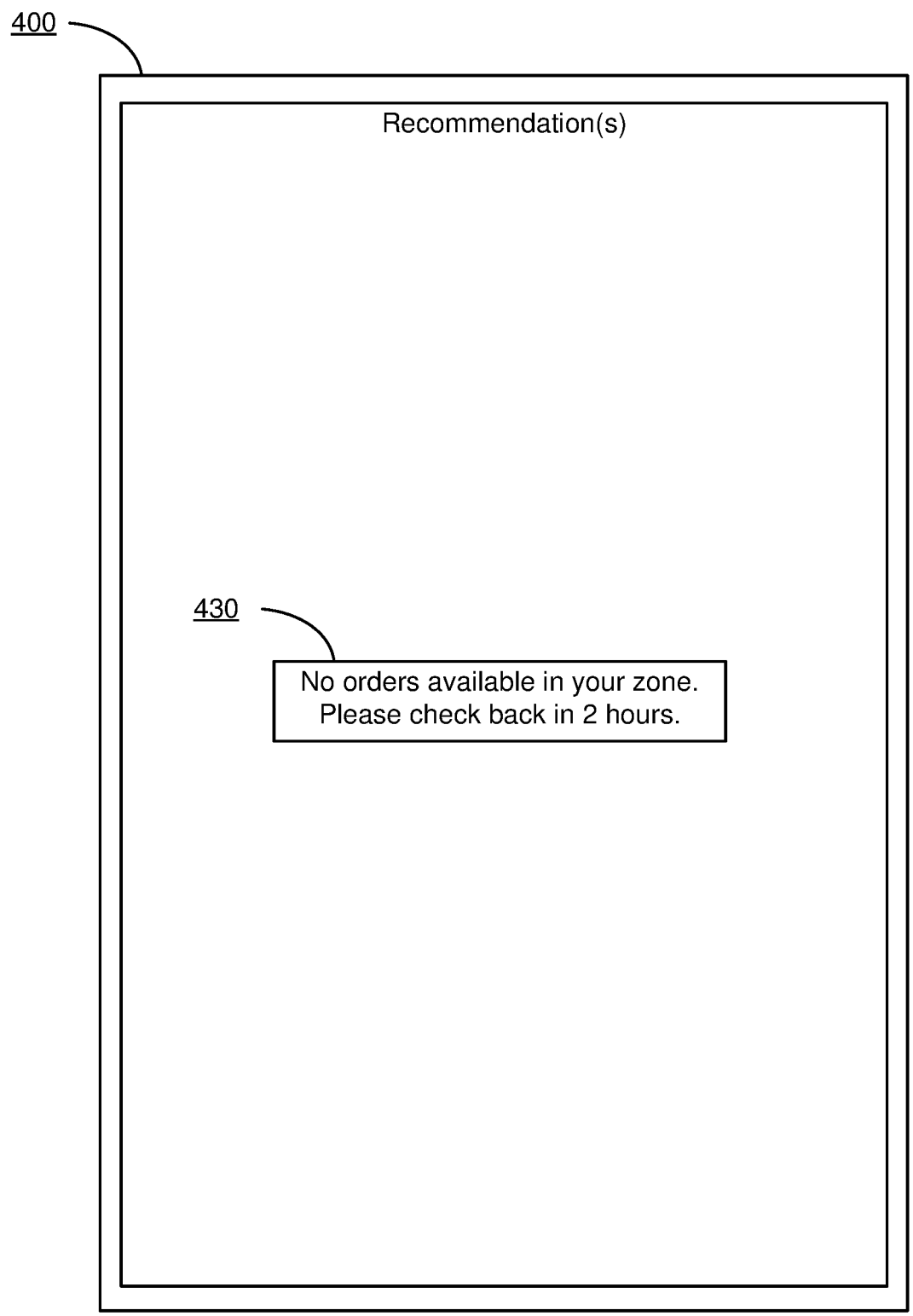

A recommendation may include various types of information. FIGS. 4A-4C illustrate examples of recommendations in a user interface 400 sent 335 for display to picker client devices 110 associated with pickers servicing orders placed with an online concierge system 140 based on actual and forecasted orders. Referring first to FIG. 4A, each recommendation 410A-C for accepting an actual order available for servicing may include an amount of earnings for servicing the actual order and a tip amount, tasks involved in servicing the actual order, a number of items or units included in the actual order, a retailer location at which the items are to be collected, a distance between a current location of a picker client device 110 to which the recommendation is sent 335 and the retailer location, etc. Referring now to FIG. 4B, each recommendation 420A-C for moving to a retailer location associated with a forecasted order within the timeframe may include the timeframe (4:00 PM-5:00 PM) 425 and various types of estimated or predicted information associated with the forecasted order (e.g., a predicted retailer location at which the items are to be collected, a predicted distance between a current location of a picker client device 110 to which the recommendation is sent 335 and the retailer location, etc.). In some embodiments, a recommendation 420 for moving to a retailer location associated with a forecasted order within the timeframe 425 also may include an amount of compensation. As shown in FIG. 4B, recommendations 420A and 420B for moving to retailer locations associated with forecasted orders within the timeframe 425 include relocation compensations of $8.00 and $5.00, respectively, that a picker may earn if they accept the corresponding recommendation 420A-B or move to the corresponding retailer location within the timeframe 425. Referring to FIG. 4C, a recommendation 430 to check back with the online concierge system 140 at a later time for actual and forecasted orders for servicing may include various types of information, such as information indicating that no orders are available within the geographical zone, an amount of time (two hours) that a picker should wait before checking back with the online concierge system 140, etc.

In various embodiments, the online concierge system 140 also may generate (step 330) additional types of recommendations to present to pickers and send 335 the recommendations for display to picker client devices 110 associated with the pickers. In some embodiments, the online concierge system 140 may generate 330 a recommendation identifying one or more retailer locations that are currently busy or are likely to be busy, promotions or sales associated with one or more retailer locations, etc. For example, a recommendation may indicate that a picker may want to move to a retailer location that is busy or that is usually busy during the time of the day and day of the week because an actual order is more likely to materialize at the retailer location than at other retailer locations closer to the picker. As an additional example, a recommendation may indicate that a picker may want to move to a retailer location that is offering a promotion or having a sale because an actual order is more likely to materialize at the retailer location than at other retailer locations closer to the picker. In the above examples, the online concierge system 140 may send 335 the recommendations to pickers to which the online concierge system 140 does not match 325 any actual orders or forecasted orders based on the minimized value of the matching and positioning function.

In various embodiments, the online concierge system 140 also may generate 330 a recommendation to present to pickers who have not indicated that they are currently available to service orders placed with the online concierge system 140. In such embodiments, the recommendation may include an amount of compensation, information indicating whether an actual order is available for servicing, or any other suitable types of information. For example, if the online concierge system 140 is unable to match 325 at least a threshold number or percentage of actual orders to pickers for servicing, the online concierge system 140 may generate 330 a recommendation for pickers to change their availability for servicing orders. In this example, the recommendation may be sent 335 to picker client devices 110 associated with pickers who have not indicated that they are currently available to service orders based on the location of the picker client devices 110 and the retailer locations at which items included in the actual orders are to be collected. In the above example, the recommendation may include an hourly compensation for each picker who changes their availability to indicate that they are available to service orders or information describing actual orders available for servicing that include items to be collected from retailer locations in the same geographical zone as a picker client device 110 associated with each picker.

Once the online concierge system 140 sends 335 the recommendation(s) to the picker client device 110 associated with each picker, the online concierge system 140 may receive (e.g., via the order management module 220) one or more responses to the recommendation(s). Upon receiving a response from a picker client device 110 to accept a recommendation 410 to accept an actual order for servicing, the actual order may be assigned to a picker associated with the picker client device 110 and the picker may then proceed with one or more tasks involved in servicing the actual order. In some embodiments, a forecasted order also may be assigned to a picker upon receiving a response from a picker client device 110 associated with the picker to accept a recommendation 420 to move to a retailer location associated with the forecasted order within the timeframe 425. In such embodiments, if the forecasted order subsequently materializes into an actual order, the actual order may then be assigned to the picker.

Additional Considerations

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
   receiving location information associated with a plurality of pickers available to service orders placed with an online concierge system;
   receiving a set of actual orders to be serviced by one or more pickers, wherein each actual order of the set of actual orders is associated with a geographical zone;
   accessing a machine learning model that is trained to predict a likelihood that an actual order associated with the geographical zone will be available for servicing within a timeframe, wherein the machine learning model is trained by iteratively performing following steps:
      accessing a set of training examples, each comprising features extracted from historical forecast orders and a label indicating whether a corresponding actual order was available for servicing within a specified timeframe;
      for each training example, applying the machine learning model to the features to generate a predicted likelihood that an actual order will be available for servicing within the timeframe;
      applying a loss function to compare the predicted likelihood to the label and computing an error; and updating model parameters based on the computed error to minimize the loss function;

for each forecasted order of a set of forecasted orders associated with the geographical zone, applying the machine learning model to predict the likelihood that an actual order will be available for servicing within the timeframe;

matching each picker of the plurality of pickers to an order for servicing by minimizing a value of a matching and positioning function, wherein the matching and positioning function is based at least in part on: a first difference between a location associated with each picker matched to an actual order for servicing and a first retailer location associated with a corresponding actual order, a second difference between the location associated with each picker matched to a forecasted order for servicing and a second retailer location associated with a corresponding forecasted order, and the predicted likelihood for each forecasted order;

identifying, based on the minimized a value of the matching and positioning function, at least one forecasted order of the set of forecasted orders, wherein a difference between a retailer location associated with the at least forecasted order and a retailer location associated with the one or more actual orders exceeds a maximum threshold;

excluding the at least one forecasted order from recommendation;

generating one or more recommendations to present to each picker of the plurality of pickers based at least in part on the matching, the one or more recommendations for one or more of: accepting one or more actual orders for servicing, moving to one or more retailer locations associated with one or more forecasted orders within the timeframe, and checking back with the online concierge system at a later time for a set of actual and forecasted orders for servicing;

sending the one or more recommendations for display to a picker client device associated with each picker of the plurality of pickers, wherein sending the one or more recommendations for display to the picker client device comprises:
generating a first interface displaying recommendations associated with actual orders for service,
generating a second interface displaying recommendations associated with forecasted orders within the timeframe, wherein the second interface dynamically updates as time lapses or the respective picker's location changes, and
generating a third interface displaying a recommendation on checking back with the online concierge system; and causing at least one picker of the plurality of pickers to move to one of the one or more retailer locations associated with the one or more forecasted orders within the timeframe, wherein the one or more forecasted orders do not include the at least one excluded forecasted order.

2. The method of claim 1, wherein the machine learning model is trained by:
receiving historical data associated with a demand side associated with the online concierge system; and
training the machine learning model based at least in part on the historical data associated with the demand side associated with the online concierge system.

3. The method of claim 1, wherein the one or more recommendations for moving to the one or more retailer locations associated with the one or more forecasted orders within the timeframe are associated with one or more amounts of compensation.

4. The method of claim 1, wherein generating the one or more recommendations to present to each picker of the plurality of pickers comprises:
determining one or more of: a content of the one or more recommendations and an order in which to present the content to each picker of the plurality of pickers based at least in part on a set of rules.

5. The method of claim 4, wherein the set of rules comprises: presenting the one or more actual orders in a more prominent position within the one or more recommendations than the one or more forecasted orders.

6. The method of claim 1, wherein matching each picker of the plurality of pickers to the order for servicing by minimizing the value of the matching and positioning function is based at least in part on a set of constraints, wherein the set of constraints comprises one or more of: a minimum number of pickers matched to each actual order for servicing, a maximum number of actual orders matched to each picker for servicing, a minimum number of pickers matched to each forecasted order for servicing, a maximum number of forecasted orders matched to each picker for servicing, and a maximum number of actual orders and forecasted orders included in the one or more recommendations to present to each picker of the plurality of pickers.

7. The method of claim 1, wherein matching each picker of the plurality of pickers to the order for servicing by minimizing the value of the matching and positioning function is based at least in part on an eligibility of each picker of the plurality of pickers to service an order, one or more preferences associated with each picker of the plurality of pickers, and an intent of each picker of the plurality of pickers.

8. The method of claim 1, wherein the first difference comprises a first distance between the location associated with each picker matched to an actual order for servicing and the first retailer location associated with the corresponding actual order, and the second difference comprises a second distance between the location associated with each picker matched to a forecasted order for servicing and the second retailer location associated with the corresponding forecasted order.

9. The method of claim 1, wherein the first difference comprises a first travel time between the location associated with each picker matched to an actual order for servicing and the first retailer location associated with the corresponding actual order, and the second difference comprises a second travel time between the location associated with each picker matched to a forecasted order for servicing and the second retailer location associated with the corresponding forecasted order.

10. The method of claim 1, wherein the matching and positioning function comprises a sum of the first difference and a product of the second difference and the predicted likelihood for each forecasted order of the set of forecasted orders.

11. A computer program product comprising a non-transitory computer readable storage medium having instructions encoded thereon that, when executed by a processor, cause the processor to:
receive location information associated with a plurality of pickers available to service orders placed with an online concierge system;

receive a set of actual orders to be serviced by one or more pickers, wherein each actual order of the set of actual orders is associated with a geographical zone;
access a machine learning model that is trained to predict a likelihood that an actual order associated with the geographical zone will be available for servicing within a timeframe, wherein the machine learning model is trained by iteratively performing following steps:
  accessing a set of training examples, each comprising features extracted from historical forecast orders and a label indicating whether a corresponding actual order was available for servicing within a specified timeframe;
  for each training example, applying the machine learning model to the features to generate a predicted likelihood that an actual order will be available for servicing within the timeframe;
  applying a loss function to compare the predicted likelihood to the label and computing an error; and
  updating model parameters based on the computed error to minimize the loss function;
for each forecasted order of a set of forecasted orders associated with the geographical zone, apply the machine learning model to predict the likelihood that an actual order will be available for servicing within the timeframe;
match each picker of the plurality of pickers to an order for servicing by minimizing a value of a matching and positioning function, wherein the matching and positioning function is based at least in part on: a first difference between a location associated with each picker matched to an actual order for servicing and a first retailer location associated with a corresponding actual order, a second difference between the location associated with each picker matched to a forecasted order for servicing and a second retailer location associated with a corresponding forecasted order, and the predicted likelihood for each forecasted order;
identify, based on the minimized a value of the matching and positioning function, at least one forecasted order of the set of forecasted orders, wherein a difference between a retailer location associated with the at least forecasted order and a retailer location associated with the one or more actual orders exceeds a maximum threshold;
exclude the at least one forecasted order from recommendation;
generate one or more recommendations to present to each picker of the plurality of pickers based at least in part on the matching, the one or more recommendations for one or more of: accepting one or more actual orders for servicing, moving to one or more retailer locations associated with one or more forecasted orders within the timeframe, and checking back with the online concierge system at a later time for a set of actual and forecasted orders for servicing;
send the one or more recommendations for display to a picker client device associated with each picker of the plurality of pickers, wherein sending the one or more recommendations for display to the picker client device comprises:
  generating a first interface displaying recommendations associated with actual orders for service,
  generating a second interface displaying recommendations associated with forecasted orders within the timeframe, wherein the second interface dynamically updates as time lapses or the respective picker's location changes, and
  generating a third interface displaying a recommendation on checking back with the online concierge system; and
cause at least one picker of the plurality of pickers to move to one of the one or more retailer locations associated with the one or more forecasted orders within the timeframe, wherein the one or more forecasted orders do not include the at least one excluded forecasted order.

12. The computer program product of claim 11, wherein the machine learning model is trained by:
receiving historical data associated with a demand side associated with the online concierge system; and
training the machine learning model based at least in part on the historical data associated with the demand side associated with the online concierge system.

13. The computer program product of claim 11, wherein the one or more recommendations for moving to the one or more retailer locations associated with the one or more forecasted orders within the timeframe are associated with one or more amounts of compensation.

14. The computer program product of claim 11, wherein generate the one or more recommendations to present to each picker of the plurality of pickers comprises:
determine one or more of: a content of the one or more recommendations and an order in which to present the content to each picker of the plurality of pickers based at least in part on a set of rules.

15. The computer program product of claim 14, wherein the set of rules comprises: presenting the one or more actual orders in a more prominent position within the one or more recommendations than the one or more forecasted orders.

16. The computer program product of claim 11, wherein match each picker of the plurality of pickers to the order for servicing by minimizing the value of the matching and positioning function is based at least in part on a set of constraints, wherein the set of constraints comprises one or more of: a minimum number of pickers matched to each actual order for servicing, a maximum number of actual orders matched to each picker for servicing, a minimum number of pickers matched to each forecasted order for servicing, a maximum number of forecasted orders matched to each picker for servicing, and a maximum number of actual orders and forecasted orders included in the one or more recommendations to present to each picker of the plurality of pickers.

17. The computer program product of claim 11, wherein match each picker of the plurality of pickers to the order for servicing by minimizing the value of the matching and positioning function is based at least in part on an eligibility of each picker of the plurality of pickers to service an order, one or more preferences associated with each picker of the plurality of pickers, and an intent of each picker of the plurality of pickers.

18. The computer program product of claim 11, wherein the first difference comprises a first distance between the location associated with each picker matched to an actual order for servicing and the first retailer location associated with the corresponding actual order, and the second difference comprises a second distance between the location associated with each picker matched to a forecasted order for servicing and the second retailer location associated with the corresponding forecasted order.

19. The computer program product of claim 11, wherein the first difference comprises a first travel time between the location associated with each picker matched to an actual order for servicing and the first retailer location associated with the corresponding actual order, and the second difference comprises a second travel time between the location associated with each picker matched to a forecasted order for servicing and the second retailer location associated with the corresponding forecasted order.

20. A computer system comprising:
   a processor; and
   a non-transitory computer readable storage medium storing instructions that, when executed by the processor, perform actions comprising:
      receiving location information associated with a plurality of pickers available to service orders placed with an online concierge system;
      receiving a set of actual orders to be serviced by one or more pickers, wherein each actual order of the set of actual orders is associated with a geographical zone;
   accessing a machine learning model that is trained to predict a likelihood that an actual order associated with the geographical zone will be available for servicing within a timeframe, wherein the machine learning model is trained by iteratively performing following steps:
      accessing a set of training examples, each comprising features extracted from historical forecast orders and a label indicating whether a corresponding actual order was available for servicing within a specified timeframe;
      for each training example, applying the machine learning model to the features to generate a predicted likelihood that an actual order will be available for servicing within the timeframe;
      applying a loss function to compare the predicted likelihood to the label and computing an error; and
      updating model parameters based on the computed error to minimize the loss function;
         for each forecasted order of a set of forecasted orders associated with the geographical zone, applying the machine learning model to predict the likelihood that an actual order will be available for servicing within the timeframe;
         matching each picker of the plurality of pickers to an order for servicing by minimizing a value of a matching and positioning function, wherein the matching and positioning function is based at least in part on: a first difference between a location associated with each picker matched to an actual order for servicing and a first retailer location associated with a corresponding actual order, a second difference between the location associated with each picker matched to a forecasted order for servicing and a second retailer location associated with a corresponding forecasted order, and the predicted likelihood for each forecasted order;
         identifying, based on the minimized a value of the matching and positioning function, at least one forecasted order of the set of forecasted orders, wherein a difference between a retailer location associated with the at least forecasted order and a retailer location associated with the one or more actual orders exceeds a maximum threshold;
      excluding the at least one forecasted order from recommendation;
      generating one or more recommendations to present to each picker of the plurality of pickers based at least in part on the matching, the one or more recommendations for one or more of: accepting one or more actual orders for servicing, moving to one or more retailer locations associated with one or more forecasted orders within the timeframe, and checking back with the online concierge system at a later time for a set of actual and forecasted orders for servicing;
      sending the one or more recommendations for display to a picker client device associated with each picker of the plurality of pickers, wherein sending the one or more recommendations for display to the picker client device comprises:
         generating a first interface displaying recommendations associated with actual orders for service,
         generating a second interface displaying recommendations associated with forecasted orders within the timeframe, wherein the second interface dynamically updates as time lapses or the respective picker's location changes, and
         generating a third interface displaying a recommendation on checking back with the online concierge system; and
      causing at least one picker of the plurality of pickers to move to one of the one or more retailer locations associated with the one or more forecasted orders within the timeframe, wherein the one or more forecasted orders do not include the at least one excluded forecasted order.

* * * * *